United States Patent
Negri et al.

(10) Patent No.: US 10,654,359 B2
(45) Date of Patent: May 19, 2020

(54) FINAL TRANSMISSION FOR AGRICULTURAL AND INDUSTRIAL MOTOR VEHICLES

(71) Applicant: CARRARO S.p.A., Campodaresgo (IT)

(72) Inventors: Alberto Negri, Parma (IT); Fiorenzo Fasolo, Massanzago (IT)

(73) Assignee: CARRARO S.p.A., Campodarsego (IT)

(*) Notice: Subject to any disclaimer, the term of this patent is extended or adjusted under 35 U.S.C. 154(b) by 19 days.

(21) Appl. No.: 15/738,613

(22) PCT Filed: Jun. 29, 2016

(86) PCT No.: PCT/IB2016/053877
§ 371 (c)(1),
(2) Date: Dec. 21, 2017

(87) PCT Pub. No.: WO2017/002026
PCT Pub. Date: Jan. 5, 2017

(65) Prior Publication Data
US 2018/0178646 A1    Jun. 28, 2018

(30) Foreign Application Priority Data
Jun. 30, 2015 (IT) .......... 102015000028951

(51) Int. Cl.
*F16H 1/28* (2006.01)
*B60K 17/04* (2006.01)
(Continued)

(52) U.S. Cl.
CPC .......... *B60K 17/046* (2013.01); *B60B 35/125* (2013.01); *B60K 17/16* (2013.01);
(Continued)

(58) Field of Classification Search
CPC .......... B60K 17/046; B60K 17/16; F16H 1/28; F16H 37/082; B60B 35/125
See application file for complete search history.

(56) References Cited

U.S. PATENT DOCUMENTS 3,862,667 A * 1/1975 Wolansky ............ B60K 17/043
                                                                    180/233
4,050,328 A * 9/1977 Romick ............... B60K 17/344
                                                                    475/221
(Continued)

FOREIGN PATENT DOCUMENTS

| DE | 29602254 | 3/1996 |
|---|---|---|
| DE | 102004003648 | 8/2005 |

(Continued)

OTHER PUBLICATIONS

International Search Report from International Application No. PCT/IB2016/053877 dated Nov. 16, 2016.

*Primary Examiner* — Patrick H Mackey
(74) *Attorney, Agent, or Firm* — Stradley Ronon Stevens & Young, LLP

(57) ABSTRACT

A final transmission for agricultural and industrial motor vehicles. The transmission includes a differential unit having a support structure and a differential that transmits an input motion to an intermediate transmission shaft and a transfer unit with a final shaft that transmits the motion to the driving wheel. The final transmission also has a toothed output wheel integral to the intermediate transmission shaft which engages respectively with an internally toothed crown wheel and with an intermediate toothed wheel, and also at least one toothed support wheel which engages with the internally toothed crown wheel and with the intermediate toothed wheel.

18 Claims, 5 Drawing Sheets

(51) Int. Cl.
  *B60B 35/12* (2006.01)
  *B60K 17/16* (2006.01)
  *F16H 37/08* (2006.01)
  B60B 35/00 (2006.01)
  F16H 1/22 (2006.01)
  F16H 48/08 (2006.01)

(52) U.S. Cl.
  CPC ............ *F16H 1/28* (2013.01); *F16H 37/082* (2013.01); *B60B 35/002* (2013.01); *B60Y 2200/22* (2013.01); *B60Y 2200/221* (2013.01); *B60Y 2200/41* (2013.01); *F16H 1/227* (2013.01); *F16H 48/08* (2013.01)

(56) References Cited

U.S. PATENT DOCUMENTS

| | | | |
|---|---|---|---|
| 6,431,305 B1 * | 8/2002 | Ishimori | ............ A01D 34/66 |
| | | | 180/371 |
| 6,695,738 B2 * | 2/2004 | Sullivan | ............ B60K 17/046 |
| | | | 475/222 |

FOREIGN PATENT DOCUMENTS

| | | | | |
|---|---|---|---|---|
| EP | 0523472 | | 1/1993 | |
| EP | 0523472 A2 * | | 1/1993 | ........... B60B 35/002 |
| EP | 1502797 | | 2/2005 | |
| EP | 1502797 A1 * | | 2/2005 | ........... B60B 35/002 |
| FR | 2180210 | | 11/1973 | |

* cited by examiner

FINAL TRANSMISSION FOR AGRICULTURAL AND INDUSTRIAL MOTOR VEHICLES

RELATED APPLICATIONS

The present application is a U.S. national phase application of International Application No. PCT/IB2016/053877 filed on Jun. 29, 2016, which claims the benefit of priority to Italian Patent Application No. 102015000028951, filed on Jun. 30, 2015, the contents of which are incorporated in this application by reference.

TECHNICAL FIELD

The present invention relates to a final transmission for agricultural and industrial vehicles.

BACKGROUND OF THE INVENTION

The term "final transmission" or "final drive" is generally used to indicate the transmission part that transmits the torque delivered by the engine to the wheels.

Typically, in industrial vehicles, a final transmission comprises at least one transmission shaft that receives the motion from a differential, possibly associated with a series of reduction gears and/or a brake unit, or from a reducer of various types, or from an electric, hydraulic or other motor.

Examples of such transmissions are described in U.S. Pat. Nos. 4,574,658 and 4,392,396, which provide, in particular, for the use of epicyclic transmission systems to obtain the required final reduction ratio.

However, the known solutions are not effective in cases where the vertical dimensions of the vehicle is restricted or where it is necessary to keep part of the transmission close to the ground.

One example of where this vertical limitation is observed is in the case of vehicles used in the cultivation of orchards, vineyards, olive groves and the like, where vehicles must operate beneath the branches of these plants.

For such applications it is most desired that the motor, and consequently the drive shaft, be located in the lowest possible position, so as to achieve the greatest possible reduction in the vertical dimensions of the vehicle.

However, in order not to frustrate this positioning of the motor and other transmission components, it is also necessary to use small wheels, which are poorly suited to providing traction in the presence of a high power output.

It would, however, be desirable to be able to make full use of the power that the motor is capable of delivering, especially during the different working phases of the vehicle.

Therefore, the technical problem underlying the present invention is that of providing a final transmission that makes it possible to obviate the disadvantages mentioned above with reference to the prior art.

SUMMARY OF THE INVENTION

This problem is solved by the final transmission summarized as follows.

The present invention offers some significant advantages. A main advantage lies in the fact that the final transmission according to the present invention has a structure that is particularly suited to vehicles used for the cultivation of orchards, vineyards, olive groves and the like.

Moreover, the final transmission according to the present invention makes it possible to ensure optimum performance even in vehicles of reduced vertical dimensions.

In addition, according to further aspects, the present invention allows the use of wheels of relatively large dimensions in vehicles that use a particularly low positioning of the motor and transmission.

Moreover, according to still further aspects, it is possible to obtain a downwards or upwards transfer of the delivered engine torque, for example by a gearbox or a differential, without subjecting the bearings that support the shafts and the structure in general to excessively high loads.

It is to be understood that both the foregoing general description and the following detailed description are exemplary, but are not restrictive, of the invention. Other advantages, features and modes of use of the present invention will become apparent from the following detailed description of a number of embodiments, given by way of non-limitative example.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Reference will be made to the figures of the accompanying drawing, wherein.

DETAILED DESCRIPTION OF THE INVENTION

Figure 1A:
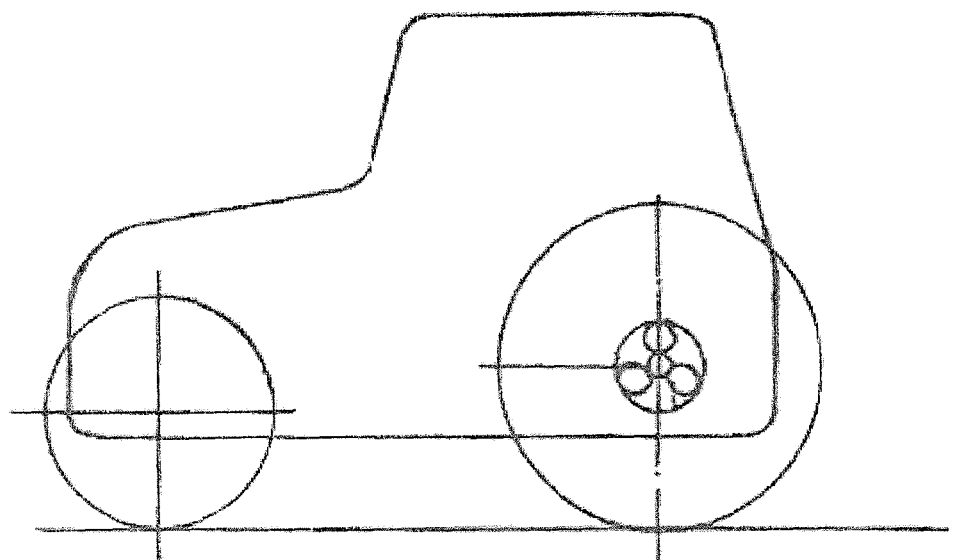
FIG. 1A is a schematic illustration of a side view of a final transmission according to the prior art.
Figure 1B:
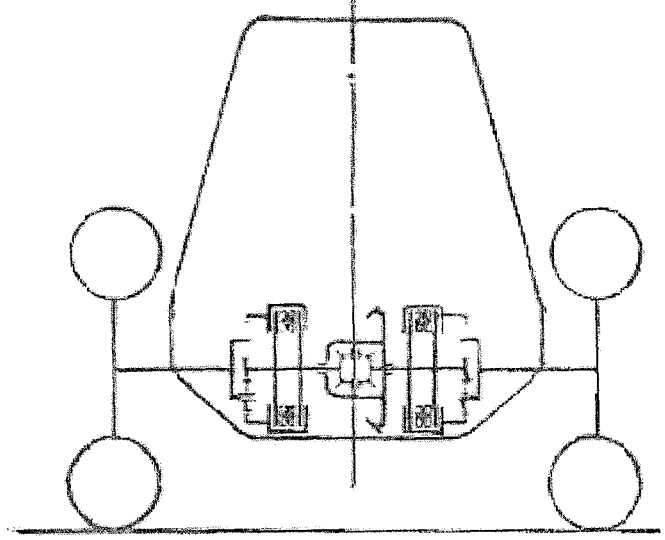
FIG. 1B is a schematic illustration of a rear view of a final transmission according to the prior art.
Figure 2A:
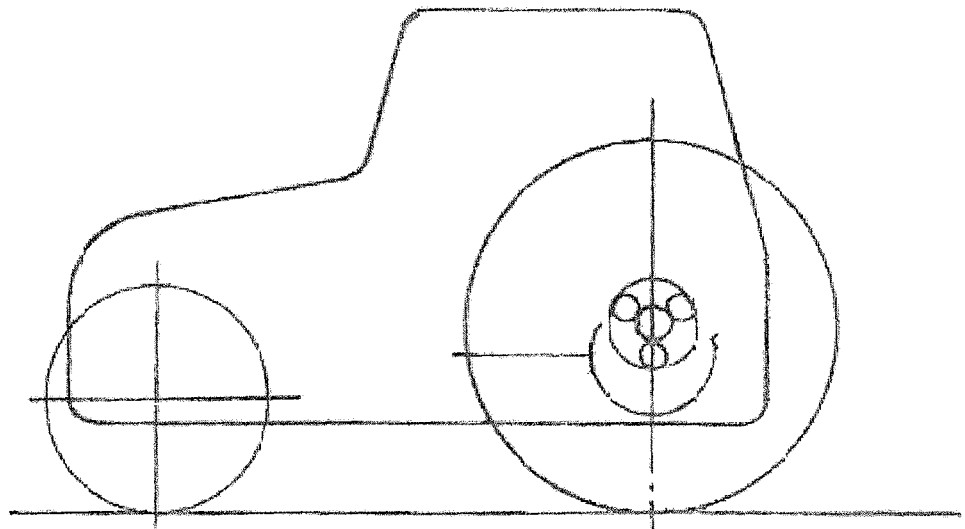
FIG. 2A is a schematic illustration of a side view of a final transmission according to one embodiment of the present invention.
Figure 2B:
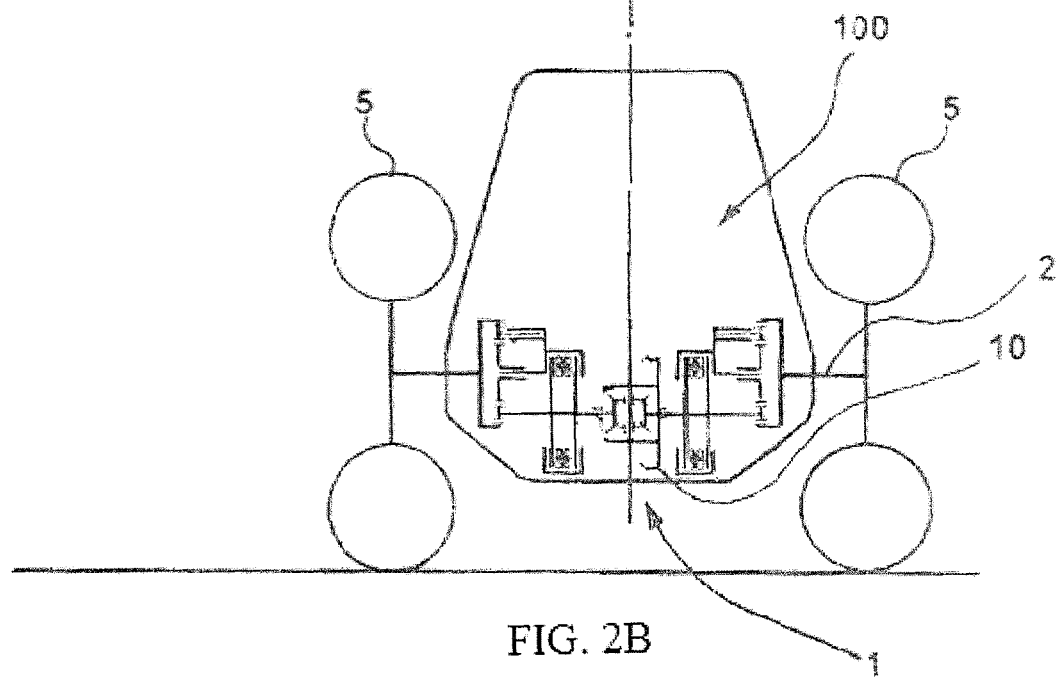
FIG. 2B is a schematic illustration of a rear view of a final transmission according to one embodiment of the present invention.

With reference initially to FIG. 2B, the numeral 100 indicates as a whole one embodiment of a final transmission according to the present invention, used in a tractor or other similar vehicle for the transmission of motion from a differential assembly 1 to rear driving wheels 5 of the vehicle.

As will become more clearly evident below, the final transmission 100 can also be used in other types of vehicles such as industrial vehicles, special industrial vehicles, such as those that use a lowered loading plane like vehicles that transport persons in airports, or for driving the front wheels of a tractor. However, it is evident that this list should not be regarded as exhaustive, and that other applications might be envisaged that require a transfer of the transmissions and to which the present invention is therefore applicable.

Figure 3:
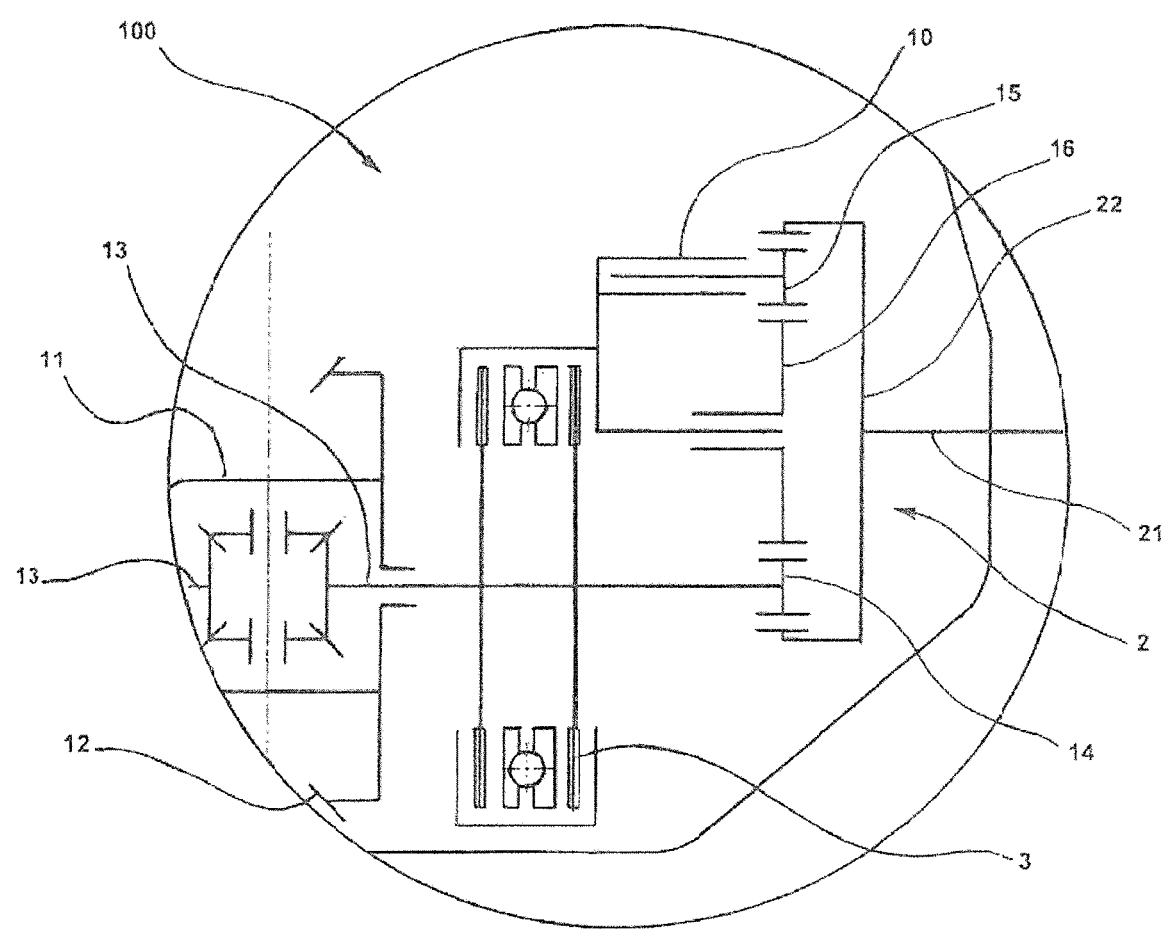
FIG. 3 is a detailed schematic illustration of the final transmission according to one embodiment of the present invention.

One embodiment of the final transmission 100 according to the present invention is illustrated schematically in FIGS. 2B and 3.

Figure 4:
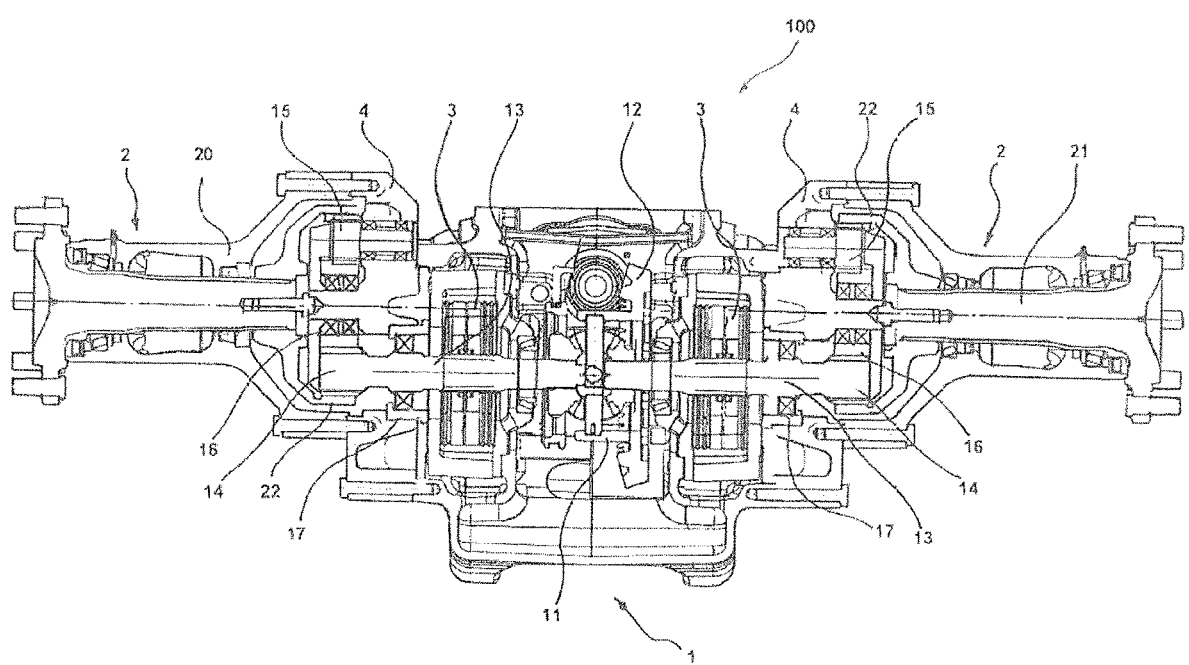
FIG. 4 is a sectional view of the final transmission according to one embodiment of the present invention.
Figure 5:
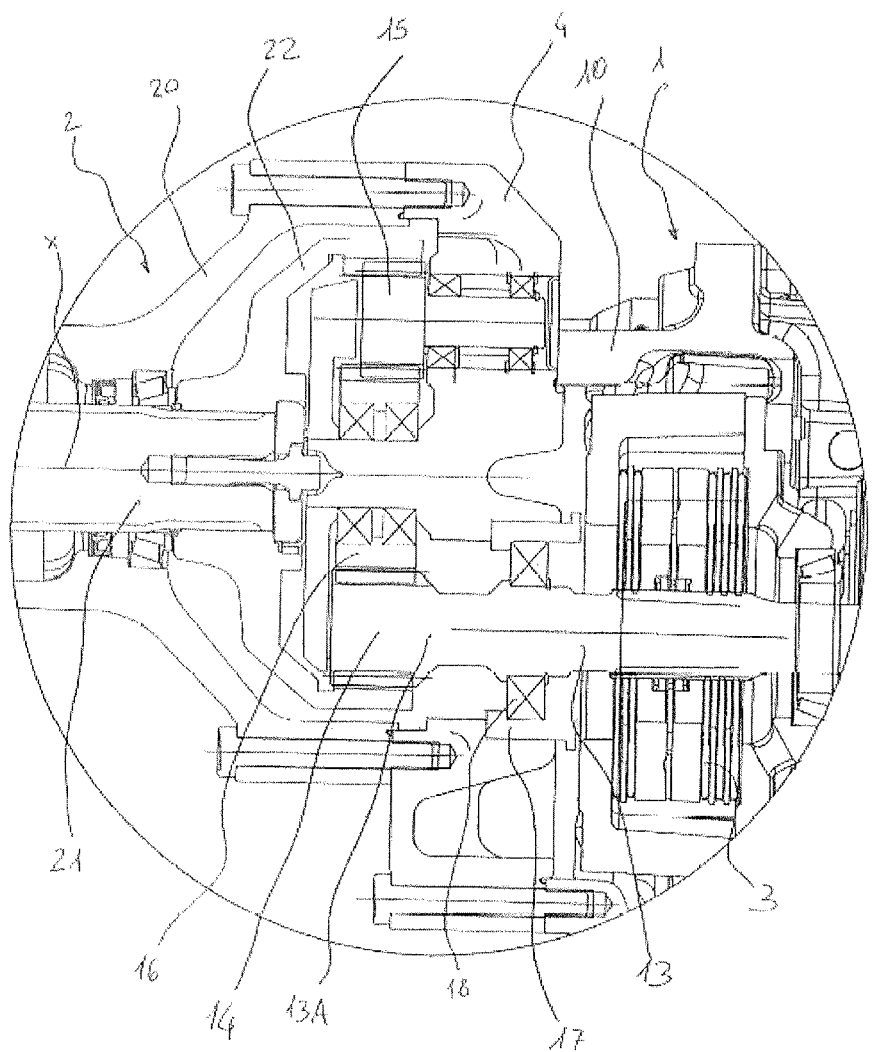
FIG. 5 is a detailed sectional view of the final transmission according to one embodiment of the present invention.

The differential assembly 1 comprises a support structure 10, illustrated more clearly in FIGS. 4 and 5, which rotatably supports a differential 11. As indicated above, according to alternative embodiments, a gearbox or reducer may also be provided in place of the differential 11.

The differential 11 may be made in a manner that is known per se and comprises a crown wheel 12, which receives the input motion from the vehicle's engine in order to distribute the torque to two intermediate transmission shafts 13.

Below, for greater simplicity of illustration, reference will be made to only one of the two intermediate transmission shafts and to the succeeding components of the final transmission 100, it being understood that the same characteristics may refer to both output components of the differential 11.

With reference therefore to FIG. 3, the final transmission 100 according to the present invention comprises a toothed output wheel 14, keyed to the intermediate transmission shaft 13 at its end 13A opposite to the end connected to the differential 11.

Optionally, a brake unit 3 may also be present, connected to the intermediate transmission shaft 13.

The motion is transmitted to the driving wheel 5 via a transfer unit 2, which comprises a final shaft 21 that receives the motion of the intermediate transmission shaft 13.

In greater detail, the transfer unit comprises an internally toothed crown wheel 22, keyed to the final shaft 21, which engages with the toothed output wheel 14.

Therefore, according to a preferred embodiment, and as can be observed in the figures, the output or final shaft 21 is parallel to the intermediate transmission shaft 13 and offset with respect to the same. Therefore, the axis of rotation of the driving wheels 5 may be offset with respect to that of the differential 11, and this advantageously allows the axis to be moved upwards or downwards according to the requirements. For example, as illustrated previously, in the case of tractors used in the cultivation of olive groves, vineyards and orchards, it will be possible to move the output shaft 21 upwards, and therefore to advantageously use larger wheels for a given set of overall vertical dimensions of the vehicle. In other applications, not illustrated, the transfer may instead be made upwards.

It will therefore be appreciated that the present invention allows the transfer to be made downwards, upwards or according to any orientation, depending on the specific application of the final transmission.

The final transmission 100 according to the present invention further comprises an intermediate toothed wheel 16 and at least one toothed support wheel 15, both rotatably connected to the support structure 10.

Preferably, the toothed output wheel 14 also engages with the intermediate toothed wheel 16 in addition to the crown wheel 22.

Preferably, the toothed support wheel 15 engages with the internally toothed crown wheel 22 and the intermediate toothed wheel 16.

In the present embodiment, the intermediate toothed wheel 16 is coaxial with the internally toothed crown wheel 22, as can be seen from the diagram in FIG. 3.

Moreover, according to a preferred embodiment, the intermediate toothed wheel 16 and the support wheel 15 are interposed between the internally toothed crown wheel 22 and the output wheel 14.

According to a preferred embodiment, the output wheel 14 and the support wheel 15 are therefore located radially with respect to the intermediate toothed wheel 16, preferably in such a position that they are uniformly distributed around the same.

Preferably, the output wheel 14 and the support wheel 15 are symmetrical with respect to an axis of rotation X defined by the output shaft 21. This advantageously allows a uniform distribution of the loads.

In one embodiment, there is only a single support wheel 15 which, as illustrated previously, is located in a position diametrically opposite to the output wheel 14 with respect to the intermediate toothed wheel 16. It is, however, evident that the solution described above also allows the use of a greater number of support wheels 15, to the benefit of the distribution of loads.

The structure of toothed wheels described above corresponds to that of a planetary gear train, in which the motion is introduced at a satellite gear, corresponding to the output wheel 14, and exits from the internally toothed crown wheel 22.

The other satellite gear, corresponding to the support wheel 15, and the sun gear, corresponding to the intermediate toothed wheel 16, are instead connected together in fixed positions, as can be seen from the schematic view of the support structure 10, to which they are both rotatably connected.

It is also evident that the planet carrier is represented by the support structure 10, with the motion input pinion represented by a satellite gear, rather than by the sun gear.

It should therefore be noted that in this way, the torque delivered by the intermediate transmission shaft 13 can be distributed between the intermediate toothed crown wheel 22 and the intermediate toothed wheel 16, thus making it possible to avoid severe stresses, and therefore the need for adequate bearing arrangements, on the intermediate transmission shaft 13.

This is also particularly advantageous in that it makes it possible to reduce the bearing arrangements required for supporting the end 13A of the intermediate transmission shaft 13.

Furthermore, the construction and the assembly of the final transmission 100 is also simplified in that it allows a reduction in the size of the gears.

According to a preferred embodiment, the end 13A of the intermediate transmission shaft 13 is supported by a bearing.

The reduction of the loads to which the bearing that supports the end 13A of the intermediate transmission shaft 13 is subject also makes it possible to support the bearing by a slightly flexible intermediate support 17, illustrated in FIGS. 4 and 5, rather than directly on the support structure 10.

In other words, the sole purpose of the intermediate support 17 is to position and possibly support the disc brake unit 3, if present.

A degree of lability may therefore be provided for the unit formed by the shaft, bearing, intermediate support and support structure, since the intermediate support 17 is connected with play or in any event with a predefined compliance to the support structure 10.

Preferably, the output shaft 21 is rotatably supported by a housing portion 20 of the transfer unit 2.

Preferably, the housing portion 20 is connected to the support structure 10 by a connecting member 4, created as a separate body with respect to the support structure 10.

According to a preferred embodiment, the intermediate toothed wheel 16 and the toothed support wheel 15 are connected to the support structure 1 by the connecting member 4. In this way, the assembly can be further simplified. In addition, this solution makes it possible to use the same differential unit, as well as the same gearbox and hydraulic motor, particularly in constructions where the differential is not provided for, used in traditional solutions with coaxial shafts.

The invention thus solves the proposed problem, providing numerous advantages with respect to the known prior art.

In particular, from a comparison between FIGS. 1A and 1B and FIGS. 2A and 2B it can be appreciated that, for a given overall set of dimensions, the invention allows the use of larger wheels, thus making the solution particularly suitable for vehicles intended to be used in orchards, vineyards and olive groves.

Furthermore, in addition to the advantages illustrated previously and in general, with respect to the other known transfer solutions, the present invention allows a reduction in the size of the bearings and other supporting elements of the transmission, with a consequent saving in terms of materials and dimensions.

In addition, the structure of the final transmission 100 according to the present invention makes it possible to maintain the directions of rotation in the transmission of the drive from the differential, or from any other element as illustrated previously, to the corresponding driving wheel. Consequently, the present final transmission 100 is particularly suitable for use in the pre-existing solutions, without the need to make any substantial modifications to the other components involved in propulsion and the transmission of motion.

The invention claimed is:

1. A final transmission for agricultural and industrial motor vehicles, comprising:
   a differential assembly comprising a support structure and a differential that transmits an incoming motion to an intermediate transmission shaft;
   a transfer unit comprising a final shaft that receives the motion of said intermediate transmission shaft and transmits it to a respective driving wheel;
   a toothed output wheel integral to said intermediate transmission shaft which engages respectively with an internally toothed crown wheel integral to said final shaft and with an intermediate toothed wheel, wherein said intermediate toothed wheel is coaxial with said toothed crown wheel; and
   at least one toothed support wheel which engages with said internally toothed crown wheel and with said intermediate toothed wheel, said toothed support wheel and said intermediate toothed wheel being rotatably supported on said support structure.

2. The final transmission according to claim 1, wherein said transfer unit further comprises a housing portion on which said final shaft is rotatably supported, said housing portion being connected to said support structure by a connecting member, being a separate body from the support structure.

3. The final transmission according to claim 2, wherein said intermediate toothed wheel and said toothed support wheel are connected to said support structure by said connecting member.

4. The final transmission according to claim 1, wherein said toothed output wheel and said toothed support wheel are symmetrical with respect to an axis of rotation defined by said final shaft.

5. The final transmission according to claim 1, wherein said intermediate transmission shaft comprises a distal extremity distanced with respect to said differential, said distal extremity being supported by a bearing supported in turn by an intermediate support connected with play or with a predefined compliance to said support structure.

6. The final transmission according to claim 5, wherein said intermediate toothed wheel and said toothed support wheel are connected to said support structure by said connecting member, and said intermediate support is connected to said connecting member.

7. The final transmission according to claim 1, wherein said final shaft is parallel to said intermediate transmission shaft and offset with respect to the same.

8. The final transmission according to claim 1, wherein said intermediate toothed wheel and said toothed support wheel are interposed between said toothed crown wheel and said toothed output wheel.

9. The final transmission according to claim 8, wherein said toothed support wheel and said toothed output wheel are located radially to said intermediate toothed wheel in such a position that they are uniformly distributed around said intermediate toothed wheel.

10. The final transmission according to claim 1, wherein said toothed support wheel is located in a position diametrically opposite to said toothed output wheel with respect to said intermediate toothed wheel.

11. A final transmission for agricultural and industrial motor vehicles, comprising:
    a differential assembly comprising a support structure and a differential that transmits an incoming motion to an intermediate transmission shaft;
    a transfer unit comprising a final shaft that receives the motion of said intermediate transmission shaft and transmits it to a respective driving wheel;
    a toothed output wheel integral to said intermediate transmission shaft which engages respectively with an internally toothed crown wheel integral to said final shaft and with an intermediate toothed wheel, wherein said intermediate toothed wheel is coaxial with said toothed crown wheel; and
    at least one toothed support wheel which engages with said internally toothed crown wheel and with said intermediate toothed wheel, said toothed support wheel and said intermediate toothed wheel being rotatably supported on said support structure,
    wherein said toothed output wheel and said toothed support wheel are symmetrical with respect to an axis of rotation defined by said final shaft and said intermediate transmission shaft comprises a distal extremity distanced with respect to said differential, said distal extremity being supported by a bearing supported in turn by an intermediate support connected with play or with a predefined compliance to said support structure.

12. The final transmission according to claim 11, wherein said intermediate toothed wheel and said toothed support wheel are connected to said support structure by said connecting member, and said intermediate support is connected to said connecting member.

13. The final transmission according to claim 11, wherein said final shaft is parallel to said intermediate transmission shaft and offset with respect to the same.

14. The final transmission according to claim 11, wherein said intermediate toothed wheel and said toothed support wheel are interposed between said toothed crown wheel and said toothed output wheel.

15. The final transmission according to claim 14, wherein said toothed support wheel and said toothed output wheel are located radially to said intermediate toothed wheel in such a position that they are uniformly distributed around said intermediate toothed wheel.

16. A final transmission for agricultural and industrial motor vehicles, comprising:
- a differential assembly comprising a support structure and a differential that transmits an incoming motion to an intermediate transmission shaft;
- a transfer unit comprising a final shaft that receives the motion of said intermediate transmission shaft and transmits it to a respective driving wheel;
- a toothed output wheel integral to said intermediate transmission shaft which engages respectively with an internally toothed crown wheel integral to said final shaft and with an intermediate toothed wheel; and
- at least one toothed support wheel which engages with said internally toothed crown wheel and with said intermediate toothed wheel, said toothed support wheel and said intermediate toothed wheel being rotatably supported on said support structure,
- wherein said final shaft is parallel to said intermediate transmission shaft and offset with respect to the same, said intermediate toothed wheel is coaxial with said toothed crown wheel, and said intermediate toothed wheel and said toothed support wheel are interposed between said toothed crown wheel and said toothed output wheel.

17. The final transmission according to claim 16, wherein said toothed support wheel and said toothed output wheel are located radially to said intermediate toothed wheel in such a position that they are uniformly distributed around said intermediate toothed wheel.

18. The final transmission according to claim 17, wherein said toothed support wheel is located in a position diametrically opposite to said toothed output wheel with respect to said intermediate toothed wheel.

\* \* \* \* \*